United States Patent [19]

Hugenin

[11] Patent Number: 5,047,783
[45] Date of Patent: Sep. 10, 1991

[54] MILLIMETER-WAVE IMAGING SYSTEM

[75] Inventor: G. Richard Hugenin, South Deerfield, Mass.

[73] Assignee: Millitech Corporation, South Deerfield, Mass.

[21] Appl. No.: 495,879

[22] Filed: Mar. 19, 1990

Related U.S. Application Data

[63] Continuation-in-part of Ser. No. 117,600, Nov. 6, 1987, Pat. No. 4,910,523, and a continuation-in-part of Ser. No. 194,774, May 17, 1988, and a continuation-in-part of Ser. No. 286,210, Dec. 19, 1988.

[51] Int. Cl.$^5$ .................... G01S 13/89; H01L 27/146; G02B 26/10; G01J 5/50
[52] U.S. Cl. .................................. 342/179; 342/351; 250/332; 250/334; 358/213.11
[58] Field of Search ............... 244/3.16; 342/351, 179; 250/332, 334; 358/213.11, 212

[56] References Cited

U.S. PATENT DOCUMENTS

| | | |
|---|---|---|
| 3,611,912 | 9/1986 | Falk et al. . |
| 3,622,888 | 11/1971 | Robert et al. ........................ 342/351 |
| 3,746,454 | 7/1973 | Pace et al. . |
| 3,824,593 | 7/1974 | Baird . |
| 3,840,877 | 10/1974 | Crane . |
| 3,971,025 | 7/1976 | Levine . |
| 3,986,153 | 10/1976 | Kuno et al. . |
| 4,023,173 | 5/1977 | Hidaka . |
| 4,034,949 | 7/1977 | Hoesterey et al. .................. 244/3.16 |
| 4,086,511 | 4/1978 | Redman . |
| 4,164,740 | 8/1979 | Constant . |
| 4,227,077 | 10/1980 | Hopson et al. ................. 244/3.16 X |
| 4,232,401 | 11/1980 | Chang et al. . |

(List continued on next page.)

FOREIGN PATENT DOCUMENTS 3813858 12/1988 Fed. Rep. of Germany .

OTHER PUBLICATIONS

K. S. Yngvesson, D. H. Schaubert, T. L. Korzeniowski, E. L. Kollberg, T. Thungren, and J. F. Johanson, "Endfire Tapered Slot Antennas on Dielectric Substrates", IEEE Trans. Antennas Propagat., vol. AP-33, No. 12, pp. 1392-1400 (Dec. 1985).

(List continued on next page.)

Primary Examiner—Gilberto Barron, Jr.
Attorney, Agent, or Firm—Pennie & Edmonds

[57] ABSTRACT

An improved millimeter imaging system is disclosed which generates high quality images from the field of view. Such system can be employed in a variety of application ranging from providing an aircraft pilot with an image of the landing field in fog, rain, snow, blowing sand, etc. to detection of concealed non-metallic contraband. The system elements, in which different elements detect signals from different portions of the field of view, so that images of the entire field of view are generated in real time, without using electrical or mechanical scanning. The outputs of the array elements are mapped to display pixels. The resolution of such images has previously been limited by the response characteristics of array elements to energy from only a portion of the corresponding field of view. One aspect of the invention is a significant improvement in image resolution. In the preferred embodiment, a radiation redirecting element redirects incident radiation toward the centerline of each element, so that the elements are uniformly exposed to different portions of the corresponding field of view. As a result, a plurality of display pixels corresponding to different portion of the field of view of each array element are generated, thus significantly increasing display resolution. Another aspect of the invention relates to a novel way of periodically illuminating the imaging array with background noise signal, which is then subtracted from the field of view signal, in order to reduce signal-to-noise ratio. In the preferred embodiment, an optical arrangement of a reflector/load element and a rotating polarization rotation element supplies background signal synchronously with generation of the field of view images, without utilizing electronic switching devices or special "noise" power illuminators.

36 Claims, 10 Drawing Sheets

U.S. PATENT DOCUMENTS

| | | |
|---|---|---|
| 4,317,119 | 2/1982 | Alvarez et al. |
| 4,385,354 | 5/1983 | Hornfeld et al. |
| 4,509,209 | 4/1985 | Itoh et al. |
| 4,521,861 | 6/1985 | Logan et al. |
| 4,524,385 | 6/1985 | Billingsley et al. ............ 250/334 X |
| 4,901,084 | 2/1990 | Huguenin et al. ............... 342/179 |

OTHER PUBLICATIONS

J. F. Johansson, "A Moment Method Analysis of Linearly Tapered Slot Antennas", Research Report No. 160, Dept. of Radio and Space Science, Chalmers University, (Aug. 1988).

K. S. Yngversson, J. F. Johansson, and E. L. Kollberg, "A New Integrated Slot Element Feed Array for Multi-Beam Systems", IEEE Trans. Antennas Propogat., vol. AP-34, No. 11, pp. 1372-1376, (Nov. 1986).

J. F. Johansson, "Millimetre Wave Imaging—Theory and Experiments", Research Report No. 151, Dept. of Radio and Space Science, Chalmers University (May 1986).

A. Skalare, J. Johansson, E. Kollberg, and R. Murowinski, "Integrated Slot Line Antenna with SIS Mixer for Focal Plane Array Applications", Proc. 17th European Microwave Conference, Roma, Italy (Sep. 1987).

K. S. Yngversson, J. F. Johnsson, Y. Rahmat-Samii, and Y. S. Kim, "Realizable Feed-Element Patterns and Optimum Aperture Efficiency in Multi-Beam Antenna Systems", IEEE Trans. Antennas Propogat. (Nov. 1988).

J. F. Johnsson, "Theoretical Limits for Aperture Efficiency in Multi-Beam Antenna Systems", Research Report No. 161, Dept. of Radio and Space Science, Chalmers University (Aug. 1988).

P. F. Goldsmith, "Design of Quazioptical Systems", Microwave System Design Handbook, Fifth Edition (1987).

Skolnik, Introduction to Radar Systems, pp. 81-84, 228-342, 560-566 (1980).

Gillespie and Phillips, "Array Detectors for Millimeter Line Astronomy", Astronomy and Astrophysics 73, 14-18 (1979).

Yngvesson et al., "Millimeter Wave Imaging System with an Endfire Receptor Array", Tenth Int'l Conf. on Infrared and Millimeter Waves (1985).

Neikirk et al., "Imaging Antenna Arrays", Sixth Int'l Conf. on Infrared and Millimeter Waves (1981).

Johansson et al., "Millimeter Imaging Systems with an Endfire Receptor Array", 15th European Microwave Conference (1985).

Yngvesson "Imaging Front-End Systems for Millimeter Waves and Submillimeter Waves", SPIE Conf. on Submillimeter Spectroscopy (1985).

Yngvesson, "Near-Millimeter Imaging wiht Integrated Planar Receptors: General Requirements and Constraints", Infrared and Millimeter Waves, 10, 91-110 (1983).

Yen et al., "W-Band, Microstrip Integrated Circuit Transceiver", Microwave Journal, Oct. 1987.

Singh, "W-Band Microstrip Oscillator Using InP Gunn Diode", 1987 IEEE MTT-S Digest, pp. 981-982.

Rubin, "Varsactor-Tuned Millimeter-Wave MIC Oscillator", IEEE Trans. on Microwave Theory and Techniques, Nov. 1976, 866-867.

Singh et al., "Integrated 94 GHz Transceiver wiht InP Gunn Diode Local Oscillator", Government Microelectronics and Circuits Conference (1986) pp. 295-297.

Scheleher, Introduction to Electronic Warfare (1986) pp. 284-291.

Goldsmith et al., "Gaussian Optics Lens Antennas", Microwave Journal, Jul. 1984.

Gibson, "The Vivaldi Aerial", Proceedings of the European Microwave Conf., Brighton UK (1979), pp. 101-105.

A. Fisher, "Beam-Power Plane", pp. 62-65 and 106-107, Popular Science, Jan. 1988.

"Design Definition of a Microwave Power Reception and Conversion System for Use on a High Altitude Powered Platform", NTIS report N81-27401 (1981).

Stephan et al., "A Quasi-Optical Polarization-Duplexed Balanced Mixer for Millimeter-Wave Applications", IEEE Trans. on Microwave Theory and Techniques, vol. MTT-31, No. 2 (1983) pp. 164-170.

Dixon et al., "Millimeter-Wave InP Image Line Self Mixing Gunn Oscillator", IEEE Trans. on Microwave Theory and Techniques, vol. MTT-29, pp. 958-961 (1981).

T. S. Hartwick, D. T. Hodges, D. H. Barker, and F. B. Foote, "Fare Infrared Imagery", Applied Optics 15, 1919, (1976).

(List continued on next page.)

OTHER PUBLICATIONS

D. T. Hodges and E. Reber, "Egvaluation of Passive Far Infrared Radiometric Techniques for Detection of Concealed Objects", Aerospace Report ATR-79 (7745)-1 (23 Mar. 1979).

D. T. Hodges, F. B. Foote, and R. D. Reel, "Feasibility of FIR Detection of Selected Materials", Aerospace Report ATR-77 (7675)-1 (30 Sep. 1977).

E. Reber, F. B. Foote, R. L. Schellenbaum, and R. G. Bradley, "Evaluation of Active and Passive Near Millimeter-Wave Radiometric Imaging Techniques for Detection of Concealed Objects", Sandia National Laboratories Report SAND 81-1051 (Jul. 1981).

E. E. Reber and F. B. Foote, "Evaluation of Active and Passive Near-Millimeter-Wave Radiometric Imaging Techniques for Detection of Concealed Objects", Aerospace Corporation Report ATR-80 (7843)-2 (20 Mar. 1981).

R. L. Schellenbaum, "Far Infrared Contraband Detection System Development for Personnel Search Application", Sandia Report SAND 82-0161 (Sep. 1982).

J. A. Gagliano, J. M. Cotton, D. M. Guillory, R. H. Platt, and A. T. Howard, "New Weapons Detection Concepts", Final Report on Project A-4666, Georgia Institute of Technology (Feb. 1988).

Korzeniowski et al., "Imaging System at 94 GHz Using, Tapered Slot Antenna Elements", Eighth IEEE International Conf. in Infrared and Millimeter Waves, 1983.

Vowinkel et al., "Airborne Imaging System Using Cryogenic 90-GHz Rcvr", Jun. 1981, IEEE Trans. an Microwave Theory on Techniques, vol. 29, No. 6.

MILLIMETER-WAVE IMAGING SYSTEM

CROSS-REFERENCE TO RELATED APPLICATIONS

This application is a continuation-in-part of Ser. No. 117,600, filed Nov. 6, 1987 now U.S. Pat. No. 4,910,523, of Ser. No. 194,774, filed May 17, 1988, and of Ser. No. 286,210, filed Dec. 19, 1988.

FIELD OF THE INVENTION

This invention relates to a method and apparatus for improving the quality of images produced by an array of radiation detectors. More particularly, the invention relates to a system in which image resolution is increased by enlarging the field of view to which each element of a detector array is exposed. Also, the invention relates to a noise cancellation method and apparatus that automatically supplies a background signal which is subtracted from the imaging signal.

BACKGROUND OF THE INVENTION

Millimeter waves permit generation of images in circumstances where visible and infrared wavelengths cannot since they are not significantly attenuated by common atmospheric constituents. Millimeter wave imaging systems that utilize arrays of detectors take advantage of these properties of millimeter waves in order to generate images of objects obstructed by various adverse environments. Such devices can be employed in contraband detection systems, in equipment for facilitating aircraft landing and take off in fog, and in a variety of highly desirable applications that require generation of images of objects which are not visible or detectable with other techniques. An advantage of devices utilizing arrays of detectors is that images of the entire field of view can be generated in real time, without using mechanical or electronic scanning devices.

Generally, a millimeter wave imaging system functions as follows. A lens or equivalent focusing element is used to focus radiation from the field of view onto a two-dimensional array of imaging elements disposed in the image plane of the lens. Each array element provides a continuous electrical signal responsive to the radiation incident thereon. The output signals of the detectors illustratively are used to drive a video display unit wherein each picture element (pixel) of the displayed image represents radiation from the portion of the image incident on a given detector That is, the image formed by the lens on the detector array is converted to signal outputs from individual detectors, which are mapped one-to-one to corresponding pixels of a video display.

In fields such as contraband detection and aircraft landing equipment, it is desirable to generate images of the highest possible quality. Improvements of image quality are typically associated with increasing display resolution and elimination of interfering background noise.

Since there is a minimum physical distance between detectors in the structure described above, some of the information in an image formed on the detector array is lost. In particular, while that portion of the image radiation that is incident on the central portion of the detector is sensed, around each detector there is a peripheral region where the image information is at least partially lost. A more accurate image would be produced if it were possible to direct radiation from this peripheral region to the central portion of the detector. Also, resolution and image quality would be substantially improved if it were possible to map the radiation imaged on each array element to several pixels, such that the combination of these pixels would represent imaging information from the central and peripheral portions of the detector.

Noise cancellation is a critical issue in the design of any communications and image processing equipment. Not surprisingly, it is an important issue that should be addressed in the design of imaging systems utilizing arrays of millimeter wave detectors.

An effective method of noise cancellation is periodically exposing elements of the array to random background radiation of the environment and subtracting the background signal from the signal which is received from the field of view. Since random noise present in the signal is also present in the background, the noise is eliminated when the background signal is subtracted from the detected signal Additionally, the background signal, also referred to as the comparison load, provides a common reference to all detectors so that effects of gain variations of individual detectors are minimized.

One method of supplying the background signal requires illuminating the field of view with millimeter wave radiation which is amplitude modulated using a square wave, i.e., an on-off signal. The signal, which is detected when the illumination sources are off corresponds to the background noise. When the "on" portion of the square wave is detected, the signal represents the reflected signal combined with background noise. Thus, subtracting the reflected signal that corresponds to the "off" portion of the square wave from the signal that corresponds to the reflected "on" portion yields the reflected signal without noise.

Another method involves continuous switching between the detected signal and the uniform load such as room temperature background. The need to constantly switch back and forth between the detected signal and uniform load creates inefficiencies in the system.

The noise reduction mechanism would be significantly improved if background signal was supplied to the detector arrays synchronously with the detected signal, and without relying on special sources of illumination.

SUMMARY OF THE INVENTION

The first aspect of the invention is an improvement of image quality and resolution by periodically exposing the center of each element of the detector array to signal energy from different parts of the detector's portion of the field of view. This is accomplished by continuously displacing the portion of the radiation imaged onto each detector so that all the radiation incident on each detector's portion of the array is, in effect, swept across the detector.

In the preferred embodiment, a wedge-shaped refractive element is interposed in the optical path between the imaging lens and the elements of the detector array. A beam of radiation passing through the wedge-shaped refractive element is deviated by an angle proportional to the index of refraction and the vertex angle of the wedge. As a result, signal energy is redirected from one portion of the array to another. And, in particular, the index of refraction and vertical angle of the wedge and its distance from the detector array are chosen so that signal energy that would otherwise have been incident on a peripheral portion of each detector is redirected so that it is incident on the central portion of a given array element. Moreover, by rotating the refractive element on an axis perpendicular to the array, the radiation that would have been incident on successive regions of the peripheral portion of each detector is successively directed onto the central portion of each detector.

As a result, each element of the array is exposed to radiation from different portions of its field of view, making it possible to increase resolution and improve image quality. In a specific embodiment, the outputs of array elements are sampled four times per revolution of the refractive element, and each sampled output is mapped to a different display pixel. Since each image consists of four pixels per array element and each of the four pixels represents a different but overlapping portion of the field of view of a given array element, display resolution is increased by a factor of four.

Illustratively, the images are displayed on a conventional interlaced scanning video system where each frame is scanned twice, such that "even" and "odd" scan lines are alternately displayed. The speed of rotation of the wedge-shaped element can be synchronized to video scanning with respect to lines of the display, such that four pixels corresponding to four samples obtained during one revolution of the wedge are displayed on different frames of the raster with two pixels on the "odd" lines and two on the "even" lines The second aspect of the invention relates to an improved noise reduction technique for subtracting background noise from the detected signal. It cancels noise by supplying background signal to the imaging array synchronously with the detected energy, without continuously switching back and forth between outputs of the array and background load and without special illumination.

In one embodiment, a polarizing grid is disposed in front of a background absorber of incident radiation. The grid reflects radiation polarized in one direction and transmits radiation polarized in a direction perpendicular thereto. As a result, radiation incident from the field of view which is reflected by the polarizing grid is orthogonally polarized with respect to background radiation which is transmitted by the grid. A polarization rotation element is mounted for rotation about its optical axis, so as to rotate the direction of polarization of radiation reaching the array. Since the array elements are sensitive to the direction of polarization of incident radiation, the array alternately receives radiation from the field of view and background radiation. Thus, background load is periodically supplied to the array elements synchronously with the signal from the field of view In order to eliminate noise, the background signal is then subtracted from the signal from the field of view using one of the conventional synchronous detection schemes. One such commonly employed synchronous detection techniques is referred to in the art as "Dicke Switch" or "Dicke Receiver", which is described in a variety of references including, for example, Section 7-1f "*Radio Astronomy*" by John D. Kraus, New York, McGraw-Hill, 1966, pages 248-253.

In the preferred embodiment of the invention, the polarization rotation element is combined and rotated with the wedge-shaped element of the first aspect of the invention. The rotating wedge-shaped element provides increased display resolution while the simultaneously rotating polarization rotation element supplies a background signal which is subtracted from the field of view signal in order to eliminate noise.

BRIEF DESCRIPTION OF THE DRAWINGS

These and other objects, features and advantages of the invention will be more readily apparent from the following detailed description of the preferred embodiment of the invention in which.

DESCRIPTION OF THE PREFERRED EMBODIMENT

This discussion proceeds in the following order. First, a system of the preferred embodiment is shown and its major components are described. Second, an embodiment of a detector array is illustrated. Third, a wedge-shaped refractive element, which is used to increase image resolution of the preferred embodiment, is described. Fourth, a system for synchronously supplying background signal (comparison load) is disclosed. Fifth, the discussion covers a method of displaying high quality images of this invention on an interlaced scanning video system. Finally, a system for providing a local oscillator signal is disclosed.

Figure 1:
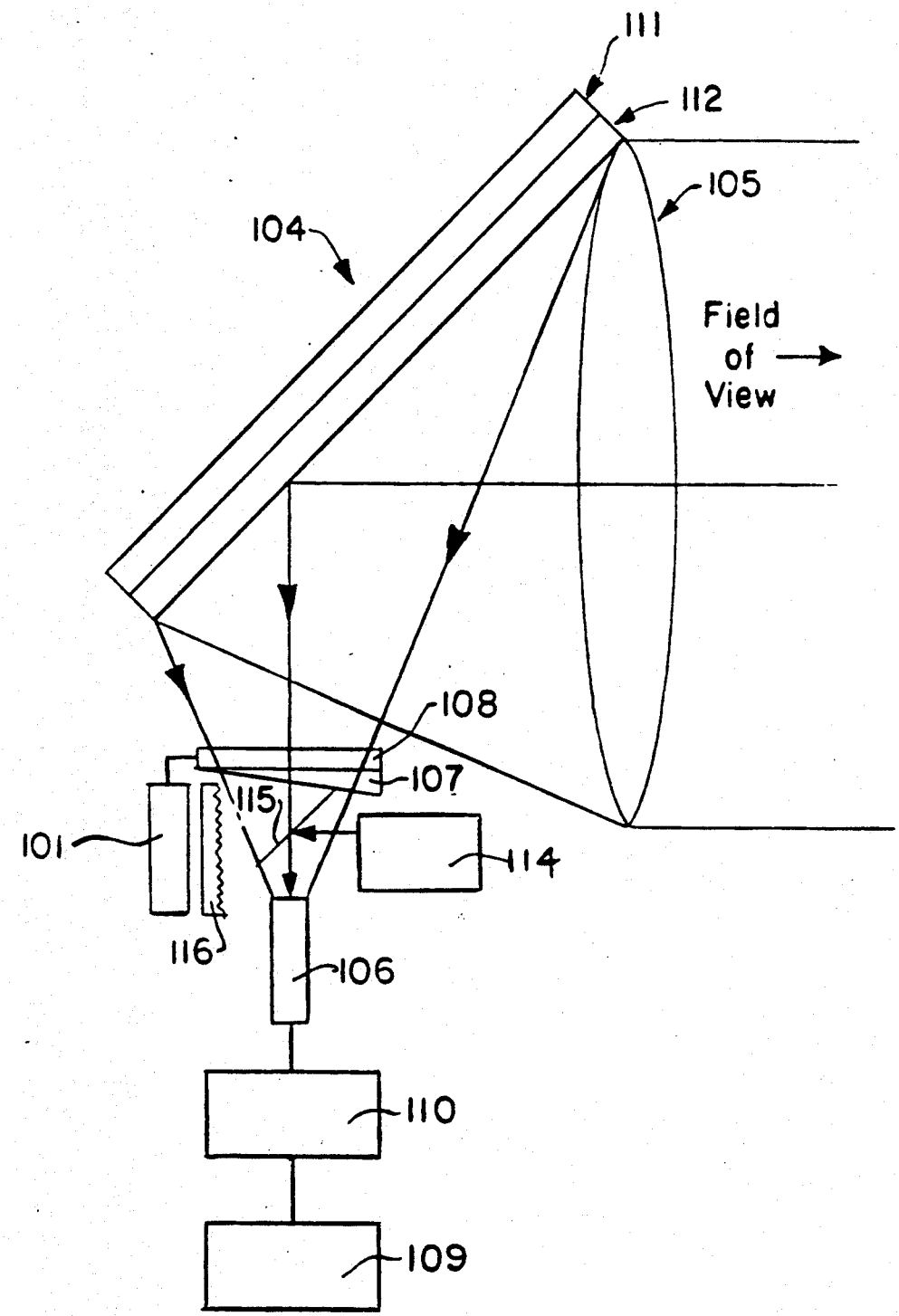
FIG. 1 is a schematic illustration of a millimeter imaging system of the present invention.

Referring now to FIG. 1, there is shown a preferred embodiment of the imaging system of the present invention. A lens 105, which illustratively is fabricated of low loss cross-linked polystyrene dielectric, collects millimeter-wave radiation from the field of view to the right in FIG. 1. The radiation from the field of view is reflected by a reflector/load element 104 onto a detector array 106 which is located such that it is effectively in the image plane of the lens. As a practical matter, any object of interest in the field of view is likely to be so far away as to be effectively at infinity and accordingly the image plane is at or close to the focal plane of the lens. An embodiment of the detector array is described in connection with FIGS. 2, 3 and 4. A combination of a polarization rotation means 108 and a wedge-shaped refractive element 107 is mounted in the optical path between the reflector/load 104 and the detector array 106. Refractive element 107 and polarization rotation means 108 are rotated by means of a motor 101, such that the axis of rotation of elements 107 and 108 coincides with the optical axis of the radiation reflected by reflector/load 104 onto the array 106. As discussed further, the rate of rotation of these elements can be synchronized with an interlaced image scan of a video display unit 109. Video display unit is driven by a generally conventional image generation and signal processing circuitry 110. Such circuitry can be designed to drive one or a plurality of different types of image displays. In this embodiment of the system it might also be desirable to feed a local oscillator signal into each of the elements of the detector array for mixing with the received signal in order to further increase signal-to-noise ratio. A local oscillator source array 114, a duplexing element 115, and a local oscillator absorbing load 116 are employed to supply a local oscillator signal. This optical arrangement is discussed in connection with FIG. 10.

The detector array 106 comprises a plurality of substantially identical imaging antenna/detector elements. Each provides an output signal, the amplitude of which corresponds to the intensity of radiation received from the portion of the field of view imaged thereon. These outputs are used for generating video images of the field of view.

Figure 2:
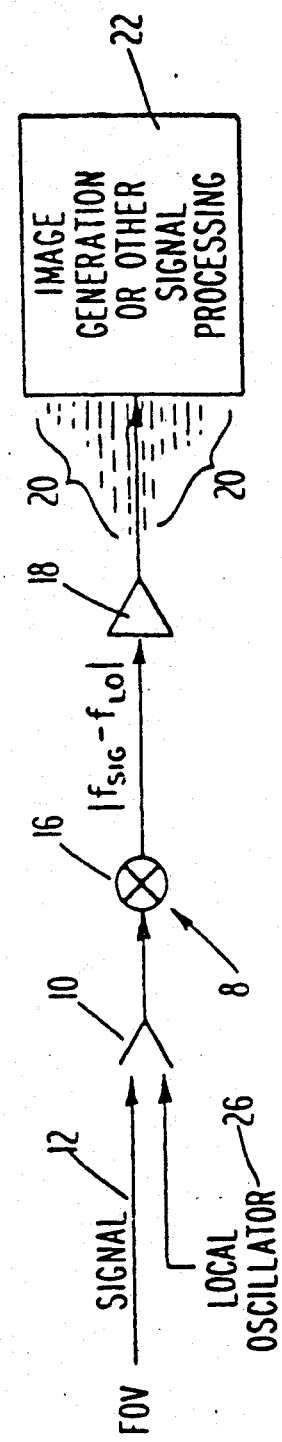
FIG. 2 is a schematic illustration of the signal path in a single element of the detector array of the present invention.
Figure 3:
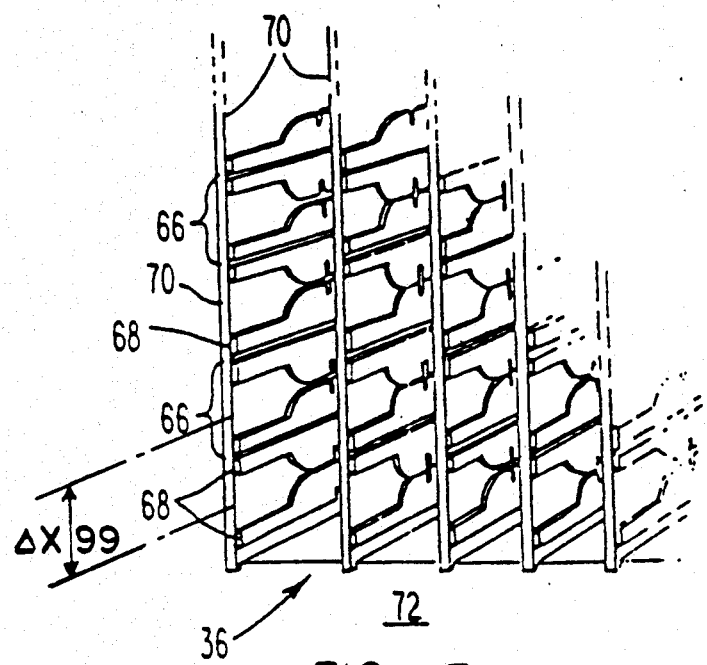
FIG. 3 is an illustration of a perspective view of a portion of a detector array used in the present invention.

The design of the detector array elements is discussed further in connection with FIGS. 2 and 3. At this stage of the discussion, it is important to note that each element of the array is more responsive to the incident radiation from the central portion of its field of view than from the peripheral portions. Since a finite physical distance separates adjacent elements, certain portions of the image formed on the elements of the detector array are not incident on the detector elements and consequently are not adequately represented in the electrical signals and displays produced therefrom. This problem is solved by the rotating refractive element 107, which provides uniform exposure of each array element to the entire portion of the radiation incident on the peripheral region around each element by redirecting radiation passing through it toward the nominal centerline of each array element. The properties of the refractive element are discussed in connection with FIG. 6.

The detector array 106 is preferentially sensitive to radiation polarized in a particular manner. In the preferred embodiment, the fact that detectors are sensitive to linear polarization is utilized to supply the background noise signal (comparison load) to elements of the array. This is accomplished by means of a reflector/load element 104 and polarization rotation element 108.

In the preferred embodiment, the reflector/load 104 comprises a radiation absorber 111 mounted behind a polarizing grid (reflector) 112. The radiation absorber 111 is a microwave absorbent material, such as carbon loaded foam. It serves as a supply of the background noise signal, which is subtracted from the signal derived from the field of view in order to improve signal-to-noise response. As mentioned, the Dicke switch or other technique of the art can be used for subtracting the background noise signal.

The polarizing grid 112 of the preferred embodiment consists of a set of parallel conducting wires or strips spaced from one another by a dielectric medium. These conductors, spaced by a half wave length or less, act as a shunt impedance for radiation with an electric field parallel to the conductors and they are essentially invisible to the electric field in the perpendicular direction. For very closely spaced conductors, essentially all the radiation with an electric field vector parallel to the conductors is reflected and essentially all the radiation with an electric field vector perpendicular to the conductors is transmitted. Such a grid can be produced by photolithographically-defined etching of metal coated mylar film, and it is available from the assignee of this application.

Accordingly, the radiation incident from the field of view with an electrical field vector parallel to the conductors of the grid is reflected onto the array of detectors 106, and perpendicular components of the electric field vector are transmitted through the grid and never reach the array. On the other hand, electric field components of "noise" radiation from the comparison load, that are perpendicular to the conductors of the grid, are transmitted through the grid and detected by the array 106, whereas parallel components are reflected and do not reach the array. Thus, radiation from the field of view that is by the polarizing grid toward the detector array is orthogonally polarized with respect to noise radiation from the comparison load that is transmitted by the polarizing grid toward the array.

In the preferred embodiment, the polarization rotation means 108, which is interposed for rotation in the optical path between the reflector/load 114 and elements of the imaging array 106, is a half-wave plate. (Half-wave plates are available from the assignee of this application). A wave-plate is a polarization sensitive element which has the property of transmitting radiation polarized in one direction at a first speed and radiation polarized in the orthogonal direction at a second speed. A half-wave plate is a wave-plate having a thickness such that the optical path length between the radiation traveling at the first speed and the radiation traveling at the second speed is such as to introduce a phase difference of $\pi$. As a result, a half-wave plate has the property of rotating the direction of polarization of incident plane polarized radiation by an angle $2\theta$ where $\theta$ is the angle between the direction of polarization of the incident radiation and the optic axis of the half-wave plate. Moreover, if the half-wave plate is rotating so that its optic axis is rotating in the same plane as the direction of polarization of the incident radiation, the effect will be to rotate the direction of polarization of the incident radiation by twice the angular frequency of the rotation of a half-wave plate. (i.e. for every 45° of plate rotation, the direction of polarization of incident radiation is rotated by 90°). Since the detector array is also polarization sensitive, the effect of the continuously rotating half-wave plate is to cause the orthogonal polarization vectors of the radiation from the field of view and that from the load to alternately become parallel with the direction of polarization to which the detector array is sensitive. Thus, in successive intervals the detector array is first responsive to radiation from the field of view and then is responsive to the comparison load. Therefore, the field of view and the comparison load are supplied to the detector array elements one right after the other, without specifically designed illuminating sources or special switching circuitry.

Figure 4:
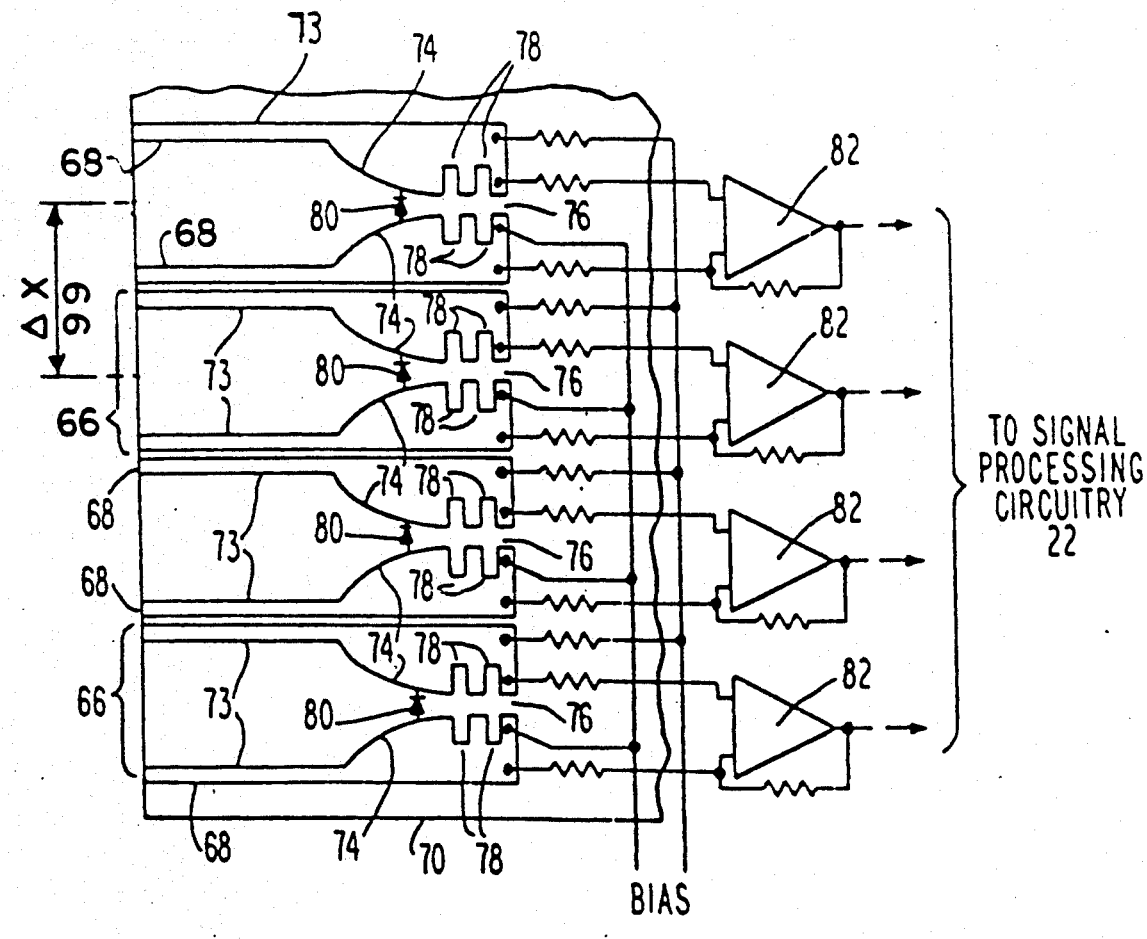
FIG. 4 is an illustration of a plan view of a portion of the detector array used in the invention.

The design of the detector array of the preferred embodiment is shown in FIGS. 2, 3 and 4 and a typical response of array elements is described in connection with FIG. 5. A more complete description of the detector array may be found in applicants' prior co-pending U.S applications: "Millimeter Wave Imaging Device," Ser. No. 117,600, filed Nov. 17, 1988 now U.S. Pat. No. 4,910,523; "Millimeter Wave Imaging Sensors, Sources, and Systems," Ser. No. 194,774, filed May 17, 1988; and "Contraband Detection System," Ser. No. 286,210, filed Dec. 19, 1988; and U.S. Pat. No. 4,901,084; all of which are incorporated herein by reference.

In the preferred embodiment, each array element is designed to detect the incident radiation and to mix a local oscillator signal in order to increase the signal-to-noise ratio of the system. For this reason, the array elements are also referred to as mixer/detector elements. The mixing of local oscillator signal with the millimeter wave energy received from the field of view results in sum and difference components which are processed to yield the intensity of the corresponding pixel of the image.

FIG. 2, which is adapted from U.S. application Ser. No. 286,210, is a block diagram showing the individual signal processing components employed in each of a large number of mixer/detector elements 8 in a specific embodiment of the imaging array. A millimeter-wave oscillator 26 provides a local oscillator signal which is mixed with the incident radiation 12 to provide a lower frequency signal for convenience in signal processing, and to further increase the signal-to-noise ratio. An antenna 10 detects radiation reflected from or emitted by objects in the field of view. Energy 12 detected from the field of view at frequency $f_{sig}$ and the local oscillator signal 14 at frequency $f_{LO}$ are combined in a mixer 16. The difference signal, at frequency $\uparrow f_{sig} - f_{LO} \uparrow$, is supplied to a video or radio frequency amplifier 18. The amplified signal, together with a number of similar signals 20 from other identical elements 8 of the array, is supplied to signal processing circuitry 22 for generation of an image, or other purposes.

FIG. 3 shows a perspective view of a portion of the detector array 36 which comprises a plurality of substantially identical mixer/detector elements indicated at 66. FIG. 4 shows a plan view of a portion of the array comprising a substrate 70 on which are formed conductors 68 making up the individual mixer/detector elements 66 of the array 36. Each element 66 comprises two conductive antenna elements 68 which may be formed directly on a non-conductive dielectric substrate such as Kapton (TM) in turn supported on alumina panels 70, which are spaced from one another by a precision spacer member 72. An outline of a preferred embodiment of the antenna elements 68 is shown in FIG. 4. As indicated, the conductive antenna elements 68 comprise parallel portions 73 which extend a distance into the array (the incident radiation being received endwise in the view shown), curved portions 74 which approach one another along an exponentially curved outline, and further portions which are separated by a slot 76 and extend for another distance.

Such an antenna is referred to in the art as an "endfire traveling wave slot antenna", as originally described by P. J. Gibson, "The Vivaldi Aerial", Proc. of the European Mic. Conf., Brighton, UK (1979), pp. 101–105. Each antenna is paired with a nonlinear circuit element, e.g. a diode, which provides the mixing function. In a particular embodiment of the device of the present invention, the detector 36 may be a 100×100 array of elements 66, resulting in 10,000 identical mixer/detector elements in the overall array 36.

As indicated, each mixer/detector element 66 comprises a pair of conductors 68, each of which has a relatively thin forward section 73 extending toward the incoming reflected and local oscillator signals, an exponential middle section 74, and a terminal slot 76 separating the two elements 68. In a preferred embodiment, slot 76 has two additional slots 78 extending from either side thereof and orthogonal thereto. These slots 78 comprise a radio frequency choke which reflects the "sum" of the local oscillator and detected signals formed upon their mixing, while passing their "difference".

The actual mixing of the local oscillator signal with the signal received from the field of view is performed by a nonlinear circuit element, e.g., a diode 80, which is preferably physically disposed between the two conductive elements 68 of each mixer/detector, that is, directly across the slot 76.

After the local oscillator signal and the signal from the field of view have been mixed by diodes 80 and filtered by the RF chokes formed by the slots 78, the difference frequency signal which remains is a relatively "clean" intermediate frequency signal which can be amplified by conventional operational signal amplifiers 82 associated with each element 66 of array 36. The output signals from amplifiers 82 are supplied directly to the signal processing circuitry.

Figure 5:
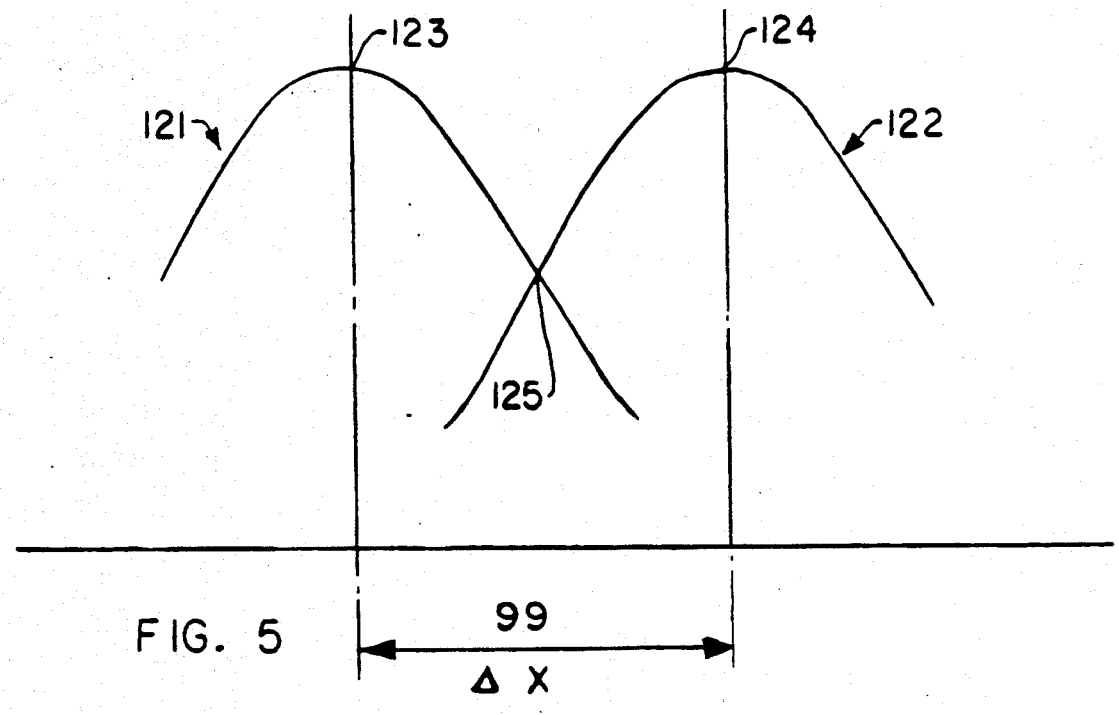
FIG. 5 is a schematic illustration of a typical signal response of two adjacent elements of the detector array of the present invention.

FIG. 5 shows two typical main lobes 121, 122 of the power responses (i.e. the square law responses) to incident radiation obtained for two adjacent elements of the array separated by the distance $\Delta x$. Each power response is plotted as a function of an angle of the effective aperture of an array element. The sidelobes of each response are omitted from this illustration. The peaks of the response curves 123, 124 are the signal response due to the portion of radiation incident on the central portions of the corresponding array elements.

Since the response of each detector element to the radiation received from the field of view varies significantly from the center of the detector to its peripheral portions, the signals from the peripheral portions are not adequately represented when these responses are mapped one-to-one to the display pixels.

According to the present invention, this problem is alleviated by exposing each detector element of the array to peripheral portions of the radiation incident on the detector from the field of view. This is accomplished by the rotating refractive element 107 which redirects incident radiation toward the center line of each detector element.

Figure 6:
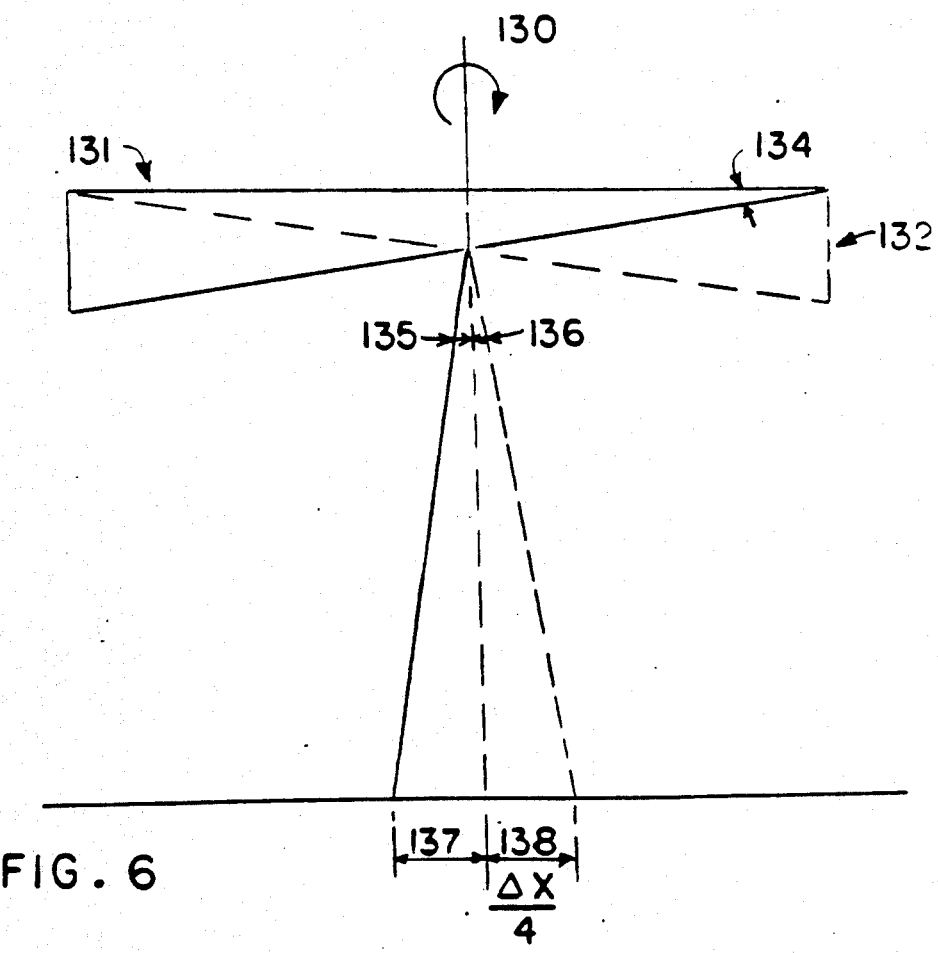
FIG. 6 is a schematic illustration depicting the effect of a wedge-shaped refractive element of the present invention.

Rotating refractive element 107 is depicted in FIG. 6 which illustrates a beam of radiation 130 propagating through the rotating refractive element 107 to the detector array 106. In the preferred embodiment, element 107 is a circular dielectric section machined into a wedge. The wedge is shown in FIG. 6 in two angular positions, once in solid lines at a first angular position and a second time in dotted lines at a second angular position 180° removed from the first. Upon passing through element 107, a beam of radiation 130 is deviated by an angle 135, which can be expressed as $(n-1)a$, where "n" is the index of refraction of the dielectric and "a" is the vertex angle 134. In the preferred embodiment, the element 107 is designed such that beams reaching the array are deviated by distance 137 equal to $\Delta x/4$ where $\Delta x$ is the distance between adjacent detector elements. As the element 107 is rotated about the central axis of the incident radiation, the deviation of the beam is also rotated. As a result, when the wedge is rotated by 180° as indicated by dotted lines 132, the beam is deviated by angle "a" 136, but in the direction which is opposite to the deviation of the beam by the wedge in the position indicated by the solid lines. Thus the beam is displaced by $\Delta x/4$ in the opposite direction. Since the same analysis applies for all other orientations of the rotating refractive element 107, the effect of the rotating element 107 is to shift the radiation incident on the detector element by a distance $2 \Delta x/4 = \Delta x/2$. As a result, the field of view of each detector element is increased by $\Delta x/2$.

Figure 7B:
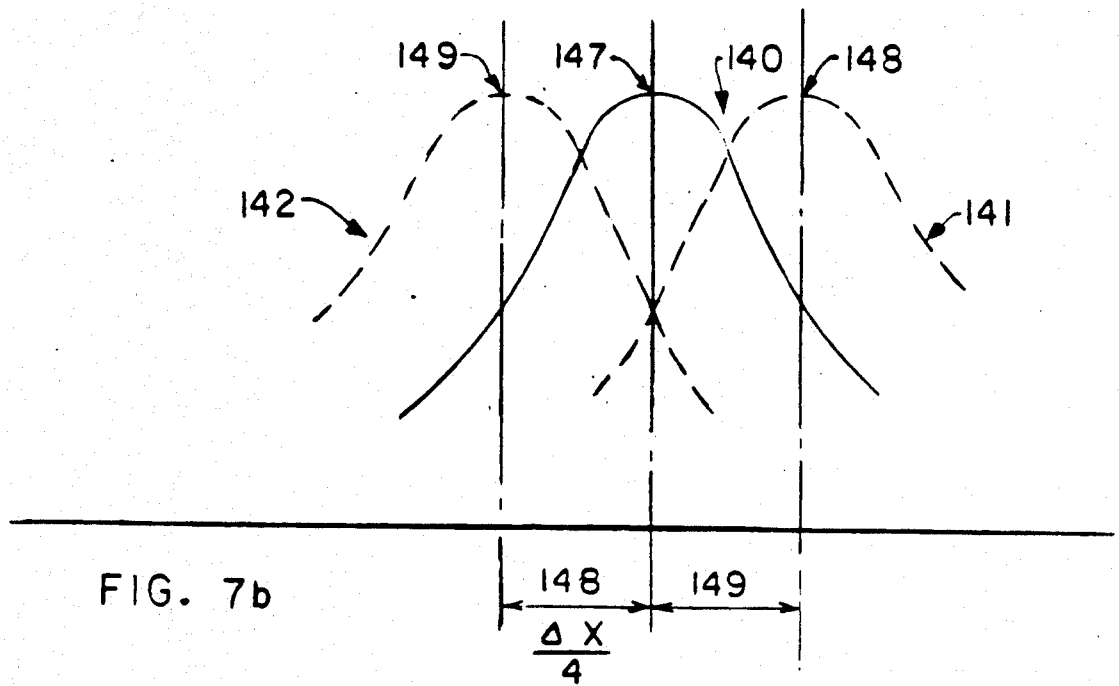
FIGS. 7(a)-(c) are schematic illustrations depicting the effect of the rotating wedge-shaped refractive element of the present invention.
Figure 7A:
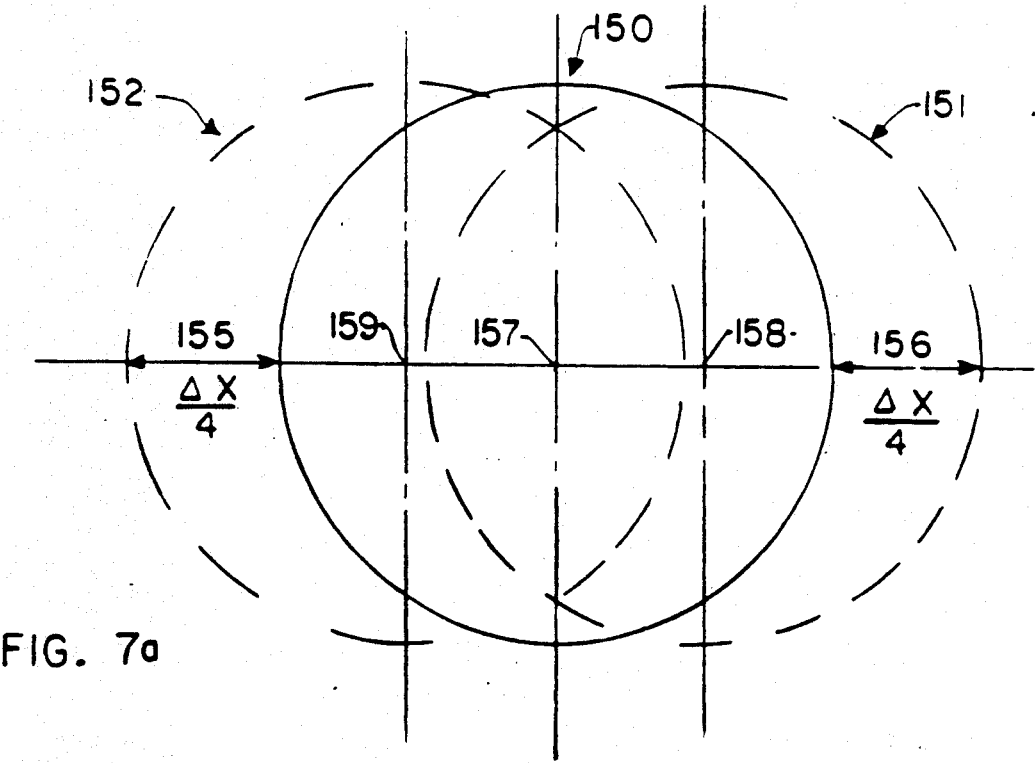
Figure 7C:
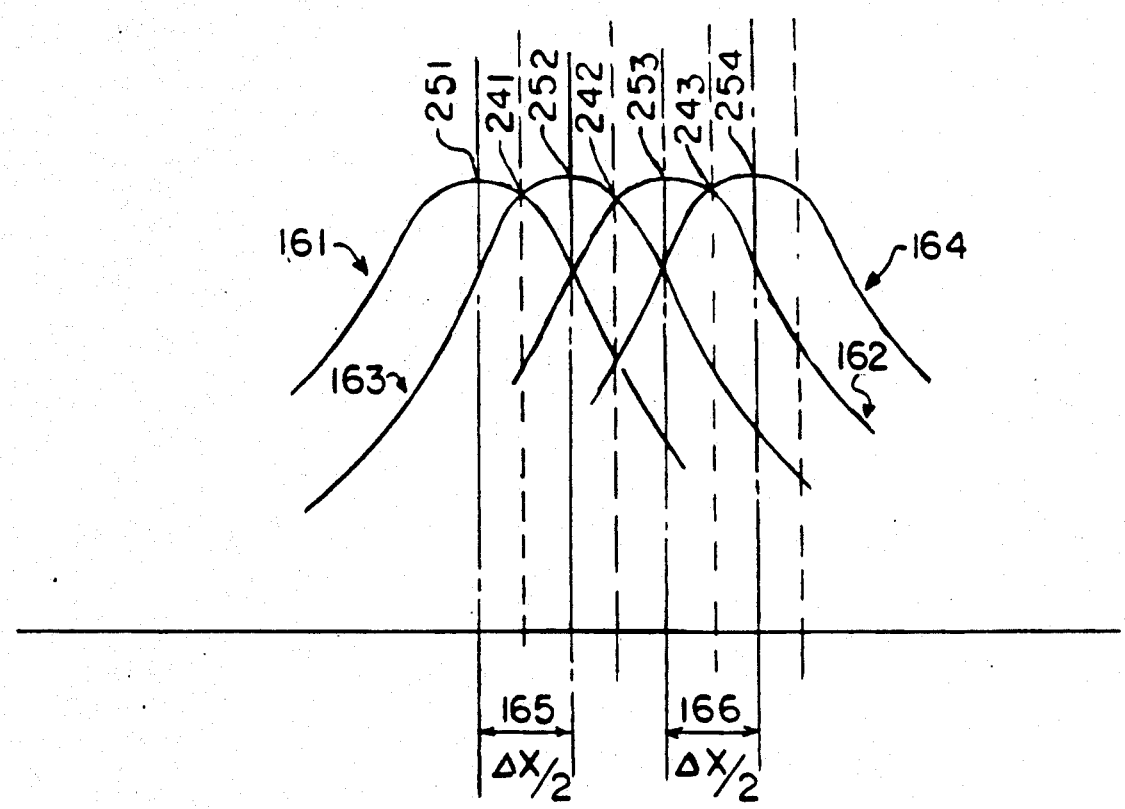

The effect of the rotating refractive element is illustrated in FIGS. 7(a)-(c). FIG. 7(a) shows three radiation patterns, depicted as circles 150, 151 and 152, that are imaged onto an element of the detector array. Circle 150 depicts an effective of aperture of an array element, and, in the absence of the refractive element, it corresponds to the field of view that is imaged onto an array element. When the refractive element is used, for one position of the refractive element the field of view represented by circle 151 is shifted by $\Delta x/4$, so that it coincides with that of circle 150, and when the refractive element is rotated 180°, the field of view represented by circle 152 is shifted $\Delta x/4$, so that it coincides with circle 150. Since at each instance of rotation, the refractive element continuously shifts the detector's fields of view by $\Delta x/4$ in the direction determined by the orientation of the wedge, as shown on FIG. 6, the effect of this shift is to increase the field of view of a detector $\Delta X/4$ in each direction.

FIG. 7(b) depicts the main lobes of the power responses of an array element to the field of view radiation patterns that are illustrated in FIG. 7(a), namely the power response 140 corresponds to the radiation pattern 150, and responses 141 and 142 correspond to the radiation patterns 151 and 152 respectively. As indicated, the peaks of the main lobes of the power responses are at the centers of the radiation patterns. The effect of the refractive element is to displace each peak by $\Delta x/4$ so that it coincides with the peak 147 of the radiation that would be imaged in the absence of the refractive element.

FIG. 7(c) illustrates the main lobes of the power responses detected by two adjacent array elements at two orientations of the refractive element differing by 180°. where curves 161 and 163 are the main lobes of the radiation patterns detected by a first element, and curves 162 and 163 are the main lobes of the radiation patterns detected by a second one. Comparing FIG. 7(c) to FIG. 5, which illustrates the power responses of adjacent elements in the absence of the refractive element, helps to appreciate the increase in resolution due to rotating refractive element. As illustrated in FIG. 5, there is a significant difference in power response at the peaks 123 and 124, which correspond to the centers of array elements separated by the distance $\Delta x$, and at the point 125 which is a response to radiation from the portion of the field of view removed $\Delta x/2$ from both centers. In FIG. 7(c), where the refractive element is used, the peaks of power responses are separated by the distance $\Delta x/2$, and the responses at the points located between the peaks is much better than at the midpoint 125 in FIG. 5. This indicates that the effect of the rotating refractive element is to provide a relatively uniform response to radiation from all the portions of the field of view.

Figure 8A:
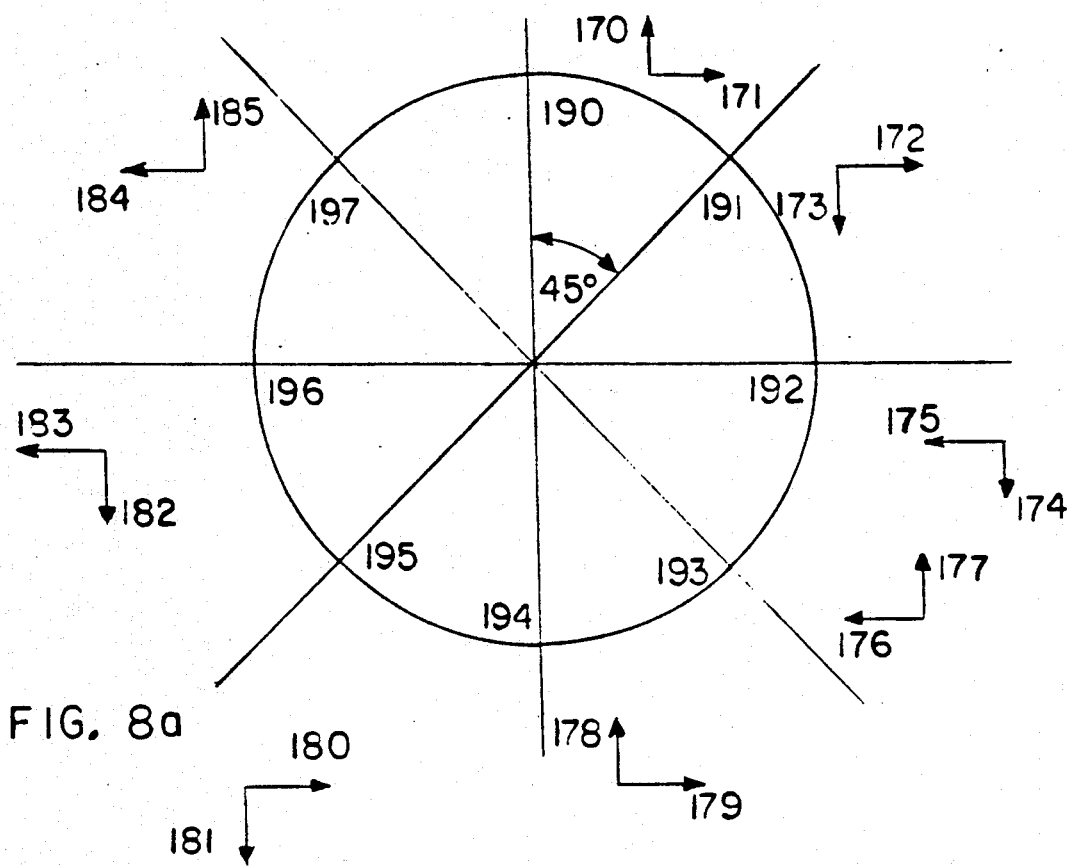
FIGS. 8(a)-(c) are schematic illustrations of the radiation patterns imaged onto the detector array of the present invention.

FIG. 8(a) is useful in understanding the operation of a half-wave plate of the preferred embodiment in canceling a comparison load signal at the array elements. As discussed above, the incident radiation on the half-wave plate consists of orthogonally polarized noise and signal components. Let us assume that at incidence on the half-wave plate the orientation of the electrical field vector of the radiation from the field of view is depicted by arrow 170 and the orientation of the load vector is depicted by arrow 171. Since a half-wave plate rotates the direction of polarization by twice the angular frequency of the rotation of the plate, after the plate is rotated by 45° (point 191), the polarization of radiation that has propagated through the plate is rotated by 90°, so that the polarization of the vector of the field of view radiation is now oriented as depicted by arrow 172 and the orientation of the load vector is as depicted by arrow 173. As illustrated in FIG. 8(a), this process is repeated throughout the rotation of the plate with the direction of polarization of the field of view radiation being given by the even numbered arrow 174-184 and the direction of polarization of the background radiation by the odd-numbered arrows 175-185.

As mentioned, the array elements of the preferred embodiment are sensitive to the particular orientation of linear polarization of incident radiation. The array of the preferred embodiment can be designed to be sensitive to either vertical or horizontal linear polarization. For purposes of this illustration, let us assume that the array is sensitive to vertical polarization. Accordingly, in this case, when the polarizing element is oriented at angles 0°, 90°, 180°, and 270° of rotation, the radiation incident on the detector array that is vertically polarized is the radiation from the field of view; and when the polarizing element is oriented at angles 45°, 135°, 225°, 315°, the radiation incident on the polarizing elements that is vertically polarized is the radiation from the load. Consequently, the detector array will alternately detect radiation from the field of view and radiation from the load.

Figure 8B:
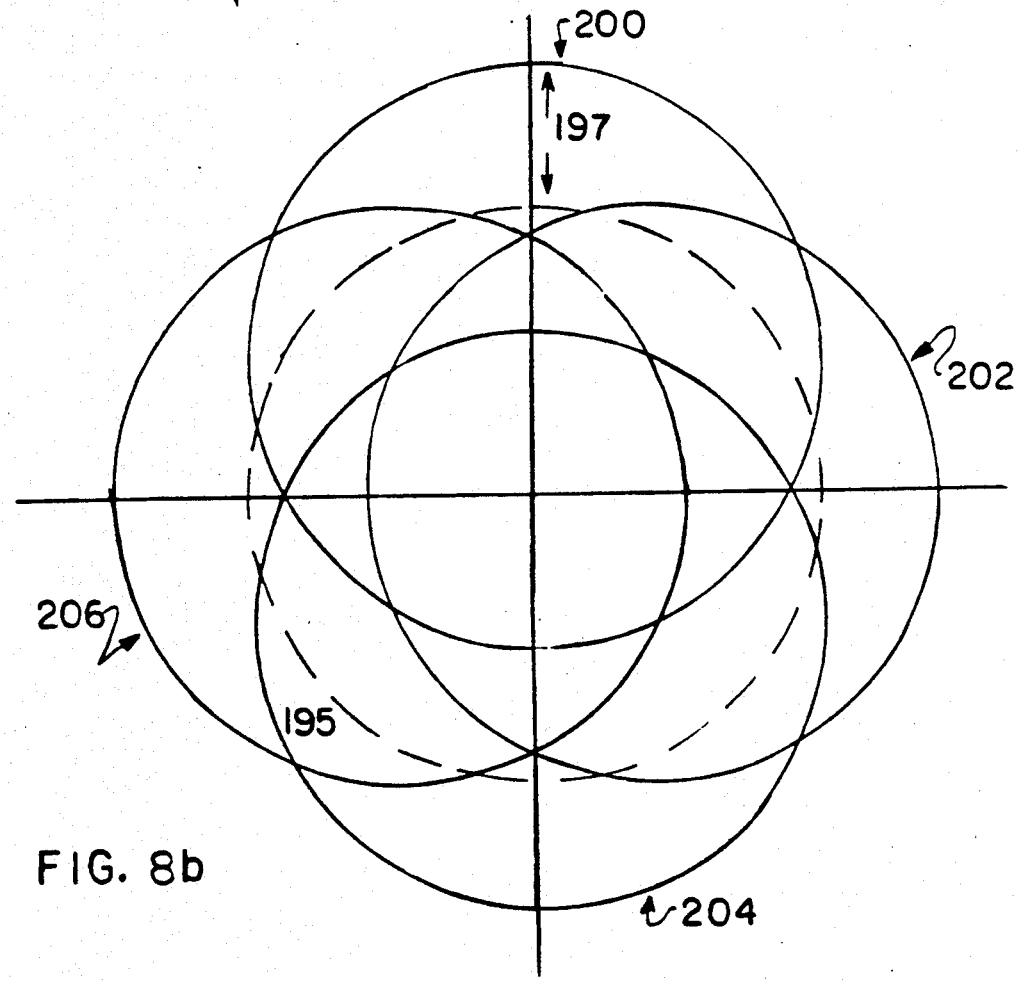

FIG. 8(b) illustrates four signals from the field of view produced by the refractive element of the preferred embodiment. Circle 195 depicts the radiation that is incident on a detector element in the absence of a refractive element 107. Circle 200 schematically shows the radiation from the detector's field of view that is incident on the detector element when the refractive element is at 0° of rotation (point 190 on FIG. 7(a)). Due to propagation through the wedge, the field of view of this signal is shifted by a distance $\Delta x/4$, with respect to the field of view that would be detected without the refractive element. Circle 202 depicts the field of view of the detector after 90° of rotation of the refractive element. Circles 204 and 206 represent the fields of view after 180° and 270°, respectively.

Figure 8C:
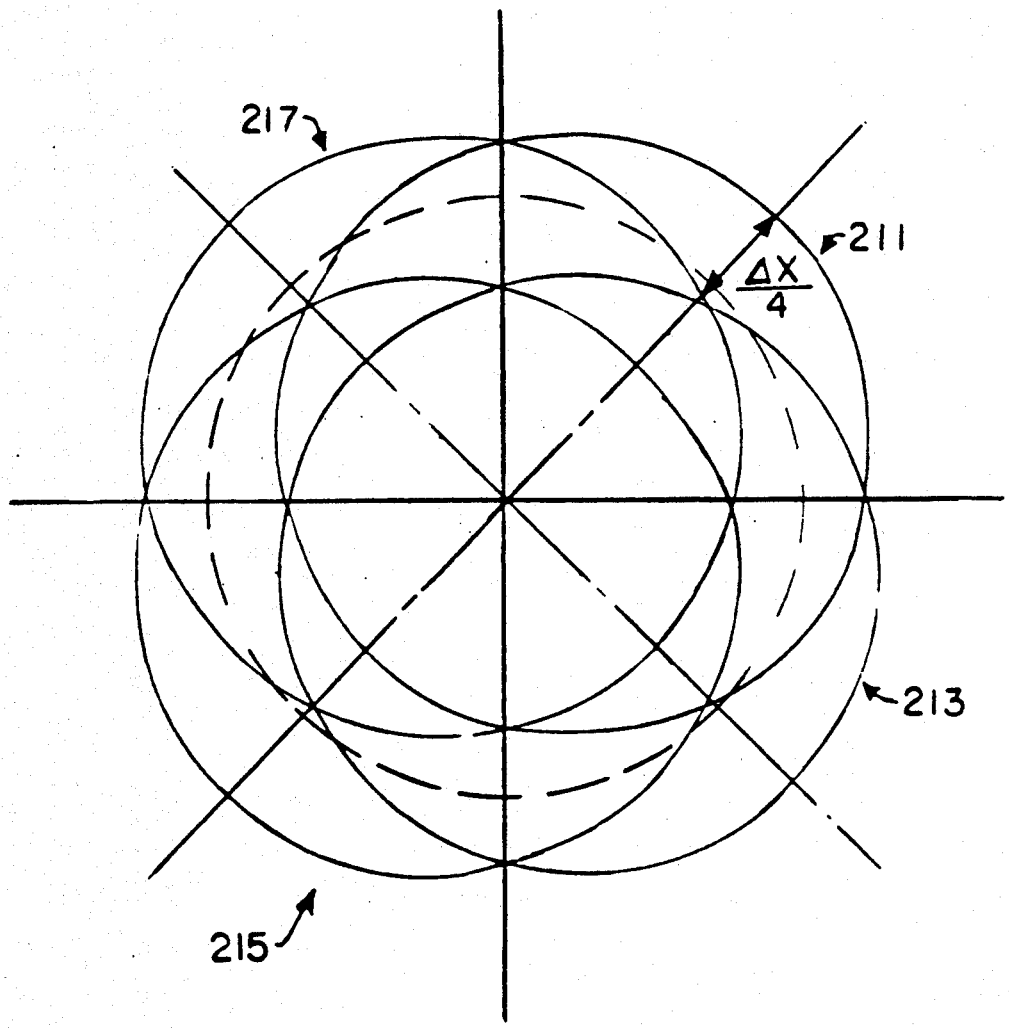

If we assume that the polarization vector of the radiation from the field of view is vertical, and that the detector elements are oriented to detect vertically polarized radiation, circles 200, 202, 204, 206 also depict the radiation patterns for which the polarization of the radiation from the field of view will be properly oriented to be detected by the detector elements after passing through the half-wave plate. Conversely, circles 211, 213, 215 and 217 in FIG. 8(c) depict radiation patterns that are projected onto the array at intervals when the half wave plate is oriented such that the polarization of the radiation from the load is properly oriented so as to be detected by the array elements.

The signal intensity of each radiation pattern from the load is subtracted by means of a signal processing circuitry from the intensity of the radiation pattern from the field of view. For example, in a specific embodiment of this invention, the load depicted by circle 211 can be subtracted from the field of view signal depicted by circle 200. The radiation patterns from the field of view without noise are signal samples that are displayed as pixels of the resultant image. Since each revolution of refractive element and the half-wave plate results in four signal samples, image resolution is increased by the factor of 4 in comparison to one pixel per array element resolution.

Advantageously, the angular velocity of rotation of the refractive element and the half-wave plate is synchronized with the scan rate of a conventional interlaced display unit. A typical television display unit scans 30 image frames per second. Therefore, in order to display one image frame per revolution, the rate of rotation should be 1,800 r.p.m.

Figure 9A:
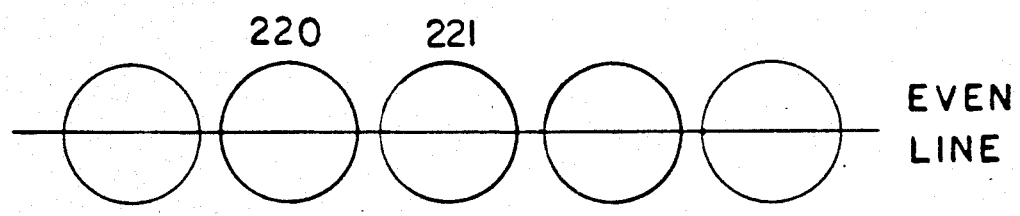
FIG. 9(a)-(b) are schematic illustrations depicting the interlaced video display of images processed in accordance with the present invention.
Figure 9A:
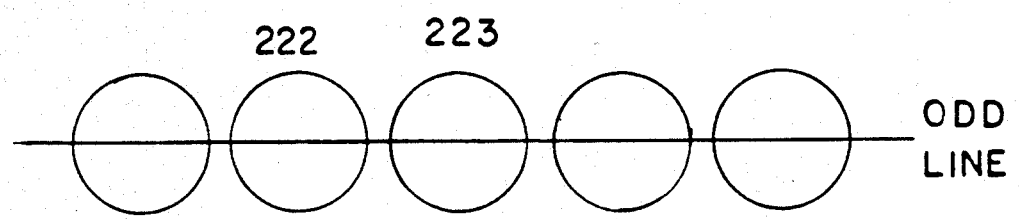
Figure 9B:
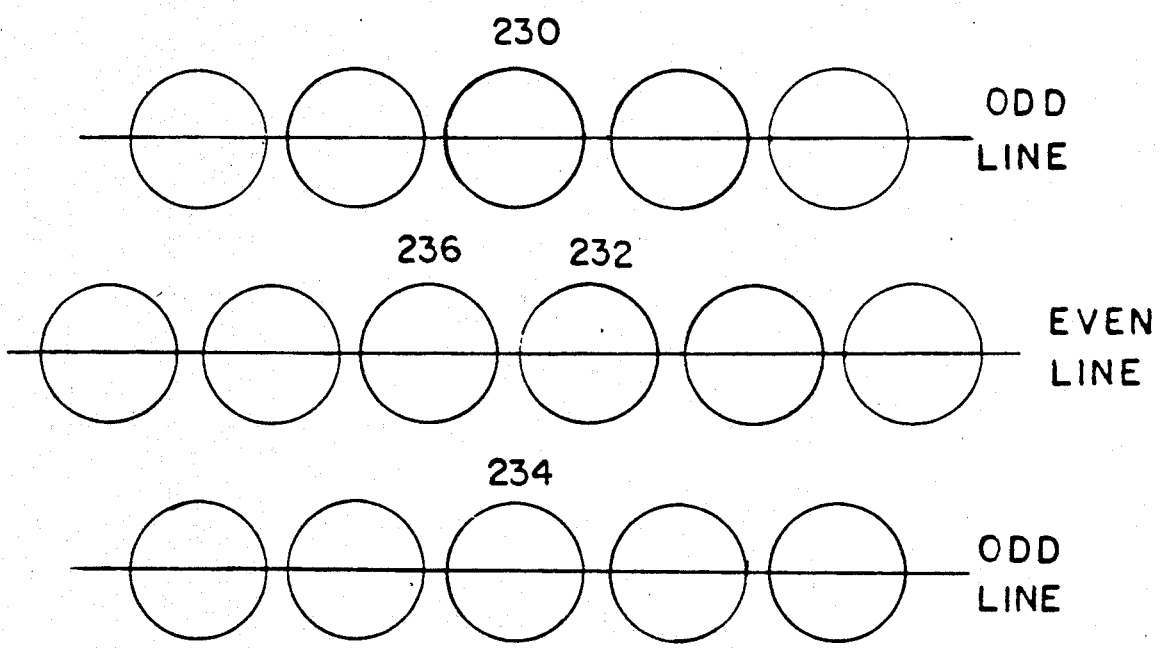

As is well known, an interlaced video system scans each image frame twice, such that alternate lines are scanned first and the remaining lines are scanned next. In order to improve visual perception of the images, two of four pixels generated by each detector are displayed during the scan of the even-numbered lines, and the remaining two during the scan of the odd-numbered lines. For example, as illustrated in FIG. 9(a), signal samples 200 and 202 may be represented by two adjoining pixels 220 and 221 on an even-numbered line; and two signal samples 204 and 206 may be displayed on the odd-numbered lines as pixels 222 and 223. Alternatively, as indicated in FIG. 9(b), signal samples may be displayed such that signal samples 206 and 202 are represented by adjoining pixels 236 and 232 on an even-numbered scan line, and signal samples 200 and 204 are displayed as pixels 230 and 234 of the consecutive odd-numbered scan-lines.

Figure 10:
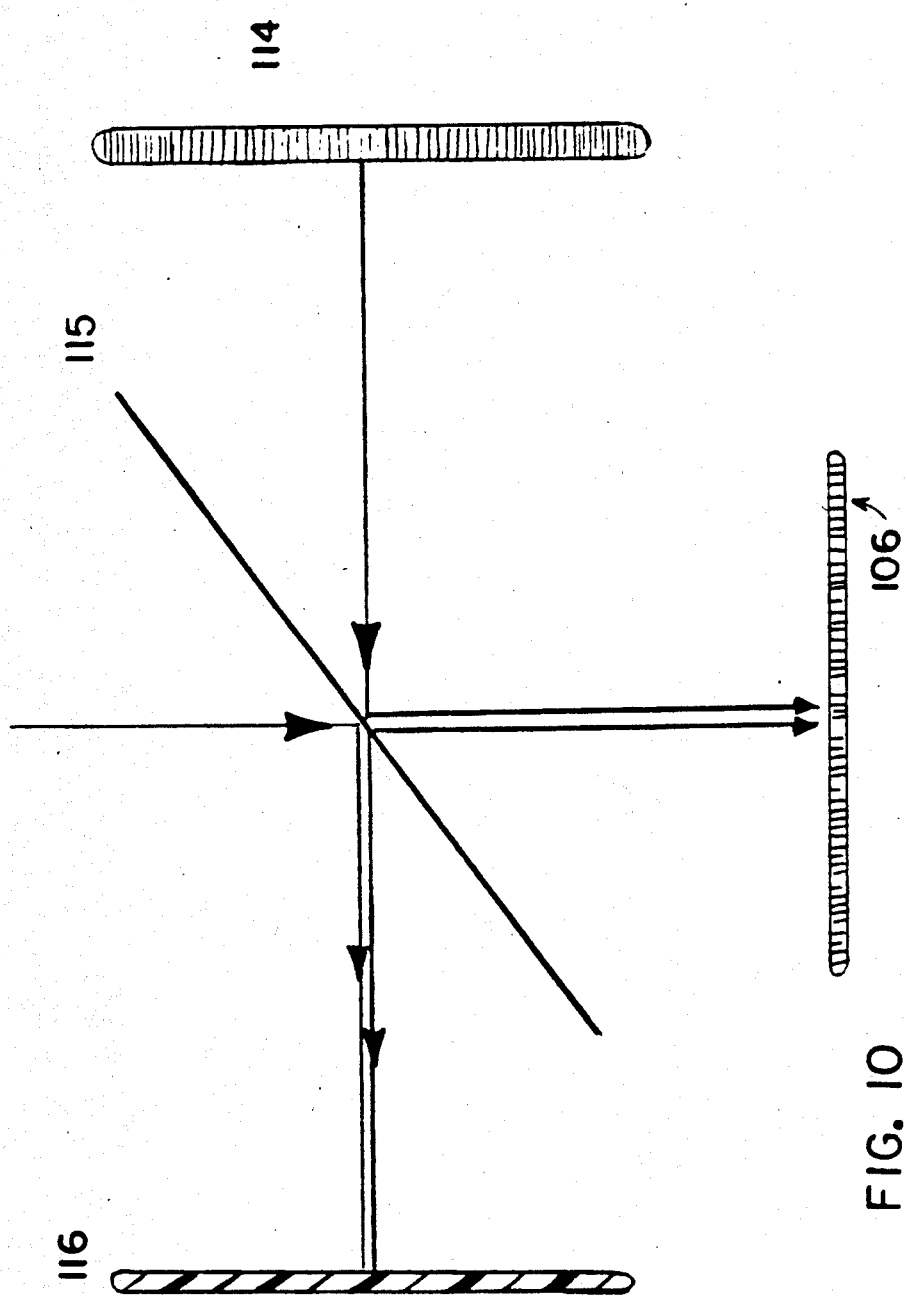
FIG. 10 is a schematic illustration of an optical arrangement for supplying the local oscillator signal to array elements of the present invention.

FIG. 10 illustrates an optical embodiment of apparatus for supplying a local oscillator signal to array elements. Local oscillator source array 114 emits millimeter-wave energy which is incident on the duplexing element 115. The field of view (or comparison load) radiation reflected (or transmitted) by the reflector 104 is incident on the opposite side of the duplexing element. The property of the duplexing element is to split linear polarized radiation into major and minor components. In this embodiment, approximately 10% of the incident signal energy is reflected by the duplexing element and approximately 90% is transmitted. Thus, the major component of the field of view (or comparison load) radiation is transmitted through the duplexing element and detected by the array elements 106, whereas the minor portion of the local oscillator signal is reflected towards the array 106. Therefore a weak local oscillator signal is combined on array 106 with a strong signal from the field of view.

As shown on FIG. 1, the transmitted major component of the local oscillator signal and the reflected minor component of the field of view signal are absorbed by absorber 116. The absorber can be manufactured from carbon loaded foam. A polarizing grid, similar to reflector 111 of FIG. 1, can be utilized as the duplexing element. The conductors of the grid are not quite parallel to the orientation of the electrical field vector which is detected by the array. Thus, a portion of the appropriately polarized radiation is reflected and a portion is transmitted.

It will be appreciated that an imaging system is disclosed that utilizes an array of detector elements, each having effective aperture aligned along an optical axis with a field of view. The response of each element of the detector array to the signal received from the corresponding portion of the field of view varies across the element's aperture, such that a maximum value is on the centerline of each element. According to the invention, a wedge-shaped refractive element, mounted in the optical path for rotation, redirects radiation toward the centerline of each detector element, such that each element of the array detects radiation from a peripheral portion of its field of view. Also, means are disclosed for alternatively directing onto the array elements the signal from the field of view and from a background source. Additionally, means are disclosed for directing a local oscillator signal onto the detector array. It will be appreciated that the system according to the invention generates high-resolution images of the field of view, while the quality of images is improved by efficiently subtracting the background noise from the field of view signal. Although the invention described above is illustrated by a "passive" system (i.e. one where the field of view is not illuminated by samples of millimeter-ware radiation), the invention is equally useful in systems utilizing illuminating sources of radiation.

The embodiment of an invention described above should not be considered to limit the invention. The invention is to be limited only by the following claims.

What is claimed is:

1. A millimeter-wave imaging system, comprising:
   an array of detector elements, each element generating a signal responsive to detected millimeter wave radiation, said elements being spaced apart a distance $\Delta X$;
   means for imaging millimeter-wave radiation from a field of view onto said array;
   means mounted in the path of radiation from the imaging means to the array of detector elements for redirecting radiation incident thereon so as to shift the point at which such radiation is incident on the detector array in a first direction a distance that is less than $\Delta X$;
   means for rotating the redirecting means in the path of radiation so as to rotate the first direction in which the radiation is shifted; and
   means for forming an image from the signals generated by the detector elements that is responsive to radiation received from the field of view wherein each pixel of the image is responsive to radiation detected by a particular element of the array from the portion of its field of view corresponding to a particular angle of orientation of said redirecting means.

2. The system of claim 1 further comprising:
   raster scanning means for forming an interlaced image responsive to radiation received from the field of view, wherein each pixel of the image is responsive to one of four signal samples sequentially detected by each detector element of the array, and said image is displayed such that each two adjoining pixels on an odd scan line correspond to two signal samples successively detected by a particular array element, and each two adjoining pixels of an even scan line correspond to the remaining successively detected signal samples, and means for synchronizing the rotation of the redirecting means with the scan rate of the raster scanning means for forming the image.

3. The system of claim 1 further comprising:
raster scanning means for forming an interlaced image responsive to radiation received from the field of view, wherein each pixel of the image is responsive to one of four signal samples sequentially detected by each detector element of the array, and said image is displayed such that the first and third signal samples detected by a particular array element are displayed as pixels of two consecutive odd scan lines, and the second and fourth signal samples are displayed as two adjoining pixels of an even scan line, and means for synchronizing the rotation of the redirecting means with the scan rate of the raster scanning means for forming the image.

4. The system of claim 1 further comprising:
means for repetitively exposing said imaging array to a comparison load radiation and
means for subtracting the signal generated by the elements of the array during said exposure to the comparison load radiation from the detected during exposure of the array to the signal from the field of view.

5. The system of claim 4, wherein said detector elements of said array are sensitive to radiation polarized in a first direction; said radiation from said field of view is polarized in a direction orthogonal to the direction of polarization of the comparison load radiation and means for alternately directing the signal from the field of view and the comparison load radiation onto the array comprises a rotating polarization rotating means mounted in the path of radiation from said field of view and the comparison load radiation to the array, such that in a first angle of rotation of said polarization rotation means, radiation from said field of view is detected by said array, and in a second angle of rotation of said polarization rotating means the comparison load radiation is detected by said array.

6. The system of claim 4 wherein said elements of said array are sensitive to radiation polarized in a first direction, and said means for repetitively exposing said imaging array to the comparison load radiation comprises a polarization-sensitive reflector interposed in the path of radiation between said field of view and said array, a background source which transmits the comparison load radiation through said reflector to said array, and a polarization rotating means mounted for rotation in the path of radiation between said reflector and said array, whereby the polarization of the radiation reaching the array from the field of view and from the background source is effectively rotated by rotation of said polarization rotating means, so that at alternating intervals the array is exposed to radiation from the field of view reflected by the reflector onto the array and to the comparison load radiation from the background source that is transmitted by said reflector.

7. The system of claim 6 wherein for every 90° of rotation of the polarization rotating means the relationship of the polarization rotating means to the reflector is such that elements of the array detect radiation from the field of view and at intervening intervals, also separated by 90° of rotation, the relationship of the polarization rotating means to the reflector is such that elements of the array detect radiation from the background source, so that for every 45° of rotation of the polarization rotating means, array elements interchangeably detect radiation from the field of view or from the background source.

8. The system of claim 7 wherein the rotation of the polarization rotating means is synchronized to the scan rate of the image.

9. The system of claim 8 wherein the polarization rotating means rotates with the redirecting means.

10. The system of claim 6 wherein the polarization rotating means is a half-wave plate.

11. The system of claim 1 further comprising means for uniformly illuminating the array of detector elements with a millimeter-wave local oscillator signal.

12. The system of claim 11 wherein the means for uniformly illuminating is an array of sources of millimeter wave energy disposed off the path of radiation between the detector array and the field of view and means in the path of radiation for directing the local oscillator signal onto the detector array while allowing the radiation from the field of view to pass therethrough.

13. A millimeter-wave imaging system comprising:
an array of detector elements, each having an effective aperture, each element generating a signal responsive to detected millimeter wave radiation from a field of view;
means for focusing millimeter-wave radiation from said field of view onto said array, such that each portion of the field of view is mapped to a specific element of the detector array;
wherein said elements are spaced apart by a spacing $\Delta x$, and wherein the signal response of each element to the signal received from the corresponding portion of the field of view effectively varies across its aperture from a maximum value centered on each element;
a refractive element mounted in said optical axis for rotation, whereby the radiation from a peripheral portion of the field of view of a detector element is redirected toward the center of the detector element, such that as the refractive element is rotated through 370° each element of the array detects radiation from 360° of the peripheral portion of the field of view of the detector element; and
means for forming an image from the signals generated by the detector elements that is responsive to radiation received from the field of view wherein each pixel of the image is responsive to radiation detected by a particular element of the array from the portion of its field of view corresponding to a particular angular rotation of said refractive element.

14. The system of claim 13 further comprising:
raster scanning means for forming an interlaced image responsive to radiation received from the field of view, wherein each pixel of the image is responsive to one of four signal samples sequentially detected by each detector element of the array, and said image is displayed such that each two adjoining pixels on an odd scan line correspond to two signal samples successively detected by a particular array element, and each two adjoining pixels of an even scan line correspond to the remaining successively detected signal samples, and means for synchronizing the rotation of the redirecting means with the scan rate of the raster scanning means for forming the image.

15. The system of claim 13 further comprising:
raster scanning means for forming an interlaced image responsive to radiation received from the field of view, wherein each pixel of the image is responsive to one of four signal samples sequentially detected by each detector element of the array, and said image is displayed such that the first and third signal samples detected by a particular array element are displayed as pixels of two consecutive odd scan lines, and the second and fourth signal samples are displayed as two adjoining pixels of an even scan line, and means for synchronizing the rotation of the redirecting means with the scan rate of the raster scanning means for forming the image.

16. The system of claim 13 further comprising:
means for repetitively exposing said imaging array to a comparison load radiation and
means for subtracting the signal generated by the elements of the array during said exposure to the comparison load radiation from that detected during exposure of the array to the signal from the field of view.

17. The system of claim 16, wherein said detector elements of said array are sensitive to radiation polarized in a first direction; said radiation from said field of view is polarized in a direction orthogonal to the direction of polarization of the comparison load radiation and means for alternately directing the signal from the field of view and the comparison load radiation onto the array comprises a rotating polarization rotating means mounted in the path of radiation from said field of view and said background source to the array, such that in a first angle of rotation of said polarization rotating means, radiation from said field of view is detected by said array, and in a second angle of rotation of said polarization rotating means the comparison load radiation is detected by said array.

18. The system of claim 16 wherein said elements of said array are sensitive to radiation polarized in a first direction, and said means for repetitively exposing said imaging array to the comparison load radiation comprises a polarization-sensitive reflector interposed in the path of radiation between said field of view and says array, a background source which transmits the comparison load radiation through said reflector to said array, and a polarization rotating means mounted for rotation in the path of radiation between said reflector and said array, whereby the polarization rotating means mounted for rotation in the path of radiation between said reflector and said array, whereby the polarization of the radiation reaching the array from the field of view and from the background source is effectively rotated by rotation of said polarization rotating means, so that at alternating intervals the array is exposed to radiation from the field of view reflected by the reflector onto the array and to the comparison load radiation from the background source that is transmitted by said reflector.

19. The system of claim 18 wherein for every 90° of rotation of the polarization rotating means the relationship of the polarization rotating means to the reflector is such that elements of the array detect radiation from the field of view and at intervening intervals, also separated by 90° of rotation, the relationship of the polarization rotating means to the reflector is such that elements of the array detect radiation from the background source, so that for every 45° of rotation of the polarization rotating means, array elements interchangeably detect radiation from the field of view or from the background source.

20. The system of claim 19 wherein the rotation of the polarization rotating means is synchronized to the scan rate of the image.

21. The system of claim 20 wherein the polarization rotating means rotates with the redirecting means.

22. The system of claim 18 wherein the polarization rotating means is a half-wave plate.

23. The system of claim 13 further comprising means for uniformly illuminating the array of detector elements with a millimeter-wave local oscillator signal.

24. The system of claim 23 wherein the means for uniformly illuminating is an array of sources of millimeter wave energy disposed off the path of radiation between the detector array and the field of view, and means in the path of radiation for directing the local oscillator signal onto the detector array while allowing the radiation from the field of view to pass therethrough.

25. A millimeter-wave imaging system, comprising:
an array of detector elements;
means for focusing millimeter wave radiation from a field of view onto said array;
background source means for providing a comparison load signal to said array of detector elements;
a polarization rotating means mounted in the path of radiation from said field of view and said background source means to the array for alternately directing the signal from the field of view and from the background source means onto the array of detector elements;
means for subtracting the signal detected by the elements of the array while the signal from the background source means is directed onto the elements of the array from that detected by the elements of the array when the signal from the field of view is directed thereon to yield an enhanced image signal having an increased signal-to-noise ratio; and
means for forming an image of the field of view responsive to the enhanced image signal detected by the array of elements.

26. The imaging system of claim 25 wherein said background source means comprises an absorber of millimeter wave radiation.

27. The system of claim 26 wherein said detector elements of said array are sensitive to radiation polarized in a first direction; said radiation from said field of view is polarized in a direction orthogonal to the direction of polarization of said radiation from said background source means and said polarization rotating means rotate such that for a first angle of rotation of said polarization rotating means, radiation from said field of view is detected by said array, and for a second angle of rotation of said polarization rotating means radiation from the background source is detected by said array.

28. The system of claim 27 wherein said polarization rotating means is a half-wave plate.

29. The system of claim 28 wherein said radiation from said field of view and said background source are combined by a polarizing grid.

30. The system of claim 25 further includes a radiation redirecting means adapted to shift radiation from the peripheral portions of the field of view of a detector element toward the center of the detector element, wherein an image of the field of view comprises pixels responsive to radiation from the different portions of the field of view of each detector of the array.

31. The system of claim 30 wherein said redirecting means is a refractive element mounted for rotation in the optical axis.

32. The system of claim 31 wherein said means for alternatingly directing the signal comprises a polarization rotating means rotating around said optical axis and said elements of said array are polarization-sensitive.

33. The system of claim 32 wherein said redirecting means rotates together with said polarization rotating means.

34. The system of claim 32 wherein said polarization rotating means is a half-wave plate.

35. The system of claim 25 in further combination with local oscillator means for uniformly illuminating of said detector array with a millimeter-wave local oscillator signal.

36. The system of claim 35 wherein said local oscillator means comprises an array of millimeter-wave oscillators disposed off the path of radiation between the detector array and the field of view and means in the path of radiation for directing said local oscillator signal onto said array of detector elements while allowing radiation from the field of view to pass therethrough.

* * * * *